(12) United States Patent
Mastrobuono (10) Patent No.: US 9,657,724 B2
(45) Date of Patent: May 23, 2017

(54) ENERGY TRANSFER AND RECYCLING OPEN-CLOSED HYBRID SYSTEM

(71) Applicant: Antonio C. Mastrobuono, Pasadena, CA (US)

(72) Inventor: Antonio C. Mastrobuono, Pasadena, CA (US)

(*) Notice: Subject to any disclaimer, the term of this patent is extended or adjusted under 35 U.S.C. 154(b) by 0 days.

(21) Appl. No.: 13/987,334

(22) Filed: Jul. 10, 2013

(65) Prior Publication Data

US 2014/0075931 A1   Mar. 20, 2014

Related U.S. Application Data

(63) Continuation-in-part of application No. 13/449,697, filed on Apr. 18, 2012, now abandoned.

(51) Int. Cl.
*F03G 7/00* (2006.01)
*F03B 1/04* (2006.01)
*F03B 17/00* (2006.01)

(52) U.S. Cl.
CPC ............... *F03G 7/00* (2013.01); *F03B 1/04* (2013.01); *F03B 17/005* (2013.01)

(58) Field of Classification Search
CPC ........ F03G 3/00; F03G 7/00; F03B 1/04; F03B 17/005
See application file for complete search history.

(56) References Cited

U.S. PATENT DOCUMENTS

| | | | |
|---|---|---|---|
| 1,589,888 A | 6/1926 | Lummis | |
| 2,379,436 A | 7/1945 | Hickman et al. | |
| 3,512,719 A | 5/1970 | Phelps et al. | |
| 3,811,275 A | 5/1974 | Mastrobuono | |
| 5,235,717 A * | 8/1993 | Lanzo et al. | .......... 15/97.1 |

* cited by examiner

*Primary Examiner* — Arun Goyal
(74) *Attorney, Agent, or Firm* — Wliliam W. Haefliger (57) ABSTRACT

The invention comprises an outer sphere, an inner sphere located within and movable relative to the outer sphere, a shaft attached to the inner sphere, jet impulse devices operatively connected to the equator of the inner sphere, and springs located to transmit the impulses via the shaft to the outer sphere. Both spheres are partially filled with liquid, and partially filled with compressed air.

24 Claims, 7 Drawing Sheets

View A-A

ENERGY TRANSFER AND RECYCLING OPEN-CLOSED HYBRID SYSTEM

This application is a continuation-in-part of pending U.S. application Ser. No. 13/449,697, filed Apr. 18, 2012.

BACKGROUND OF THE INVENTION

This invention relates generally to a novel and unique apparatus for transferring potential energy into kinetic energy to do work, for recycling kinetic energy back to potential energy, and more particularly to improvements in the apparatus to transfer work to its surroundings more efficiently with a substantial reduction of fuel consumption and air pollution.

This apparatus is a continuation-in-part of Ser. No. 13/449,697 incorporated herein by reference.

There is need for improvements in energy and work transfer apparatus embodying liquid jets, which provide jet impulses for rotary or linear motion, useful for converting torque and linear force into work.

SUMMARY OF THE INVENTION

It is a major object of the invention to provide apparatus as referred to, such apparatus basically comprising:

a) an outer sphere,
b) an inner sphere located within and movable relative to the outer sphere,
c) the inner sphere comprising:
an input aperture in a southern pole defined by the inner sphere;
a plurality of impulse generating means arranged on the outer surface of the inner sphere, and generating impulses;
a liquid flow path arranged to conduct liquid from said input aperture to the jet impulse means, and into space formed between the inner and outer spheres.
c) a shaft attached to the inner sphere,
d) and springs located to transmit said impulses via the shaft to the outer sphere.

It is a further object of the invention to locate the impulse generating means to transmit impulses about an axis of the referenced shaft.

It is another object of the invention to locate the impulse generating means to transmit impulses lengthwise of the shaft axis.

Yet another object is to locate the springs to cushion force transmission between the inner and outer spheres, at a zone between the inner and outer spheres.

An additional object is to locate the liquid jet impulse producers in that zone contained between the inner and outer spheres, for re-use of jet liquid and energy production and transfer.

These and other objects and advantages of the invention, as well as the details of an illustrative embodiment, will be more fully understood from the following specification and drawings, in which:

DETAILED DESCRIPTION

Figure 3:
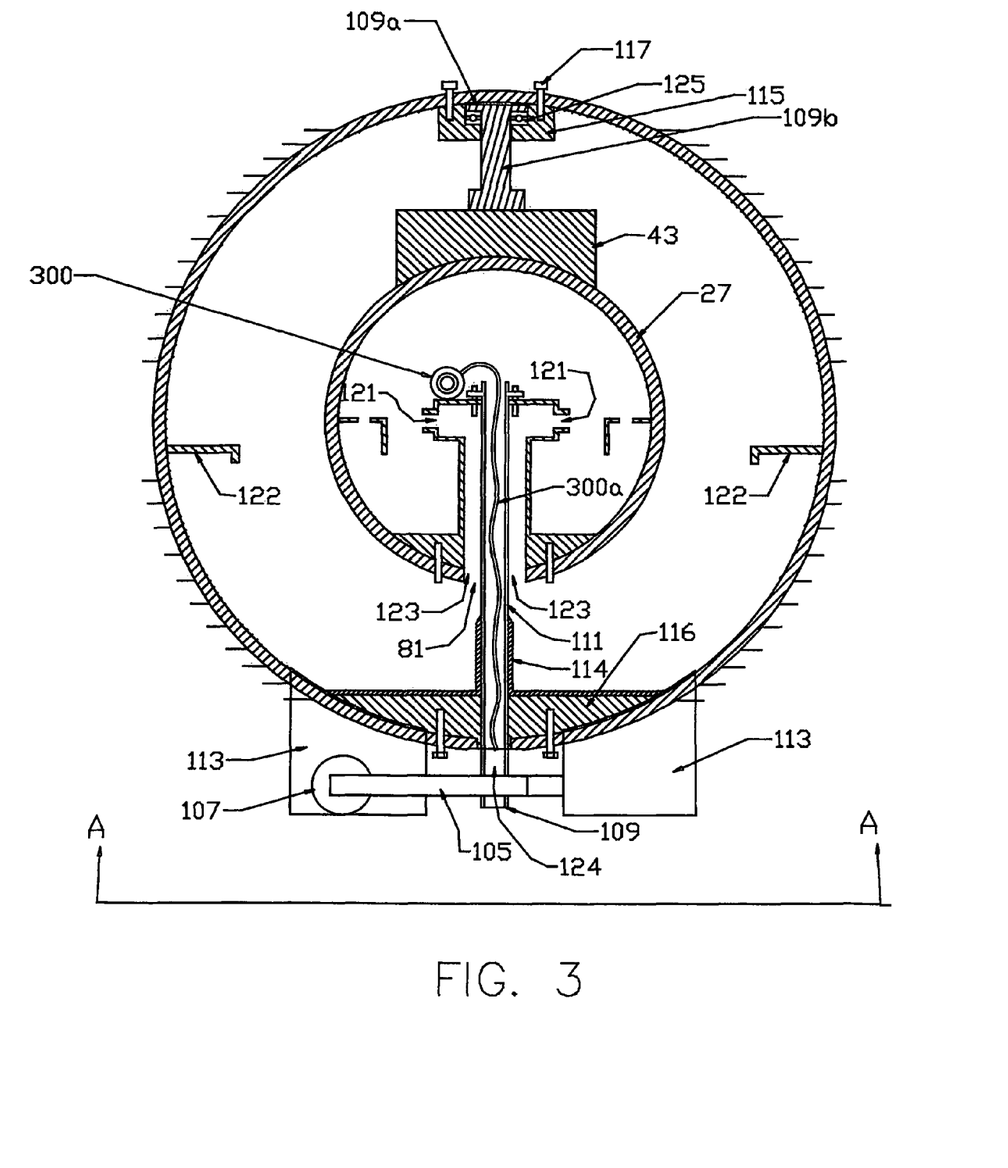
FIG. 3 is an internal view like FIG. 4, showing a horizontal arrangement of springs.
Figure 4:
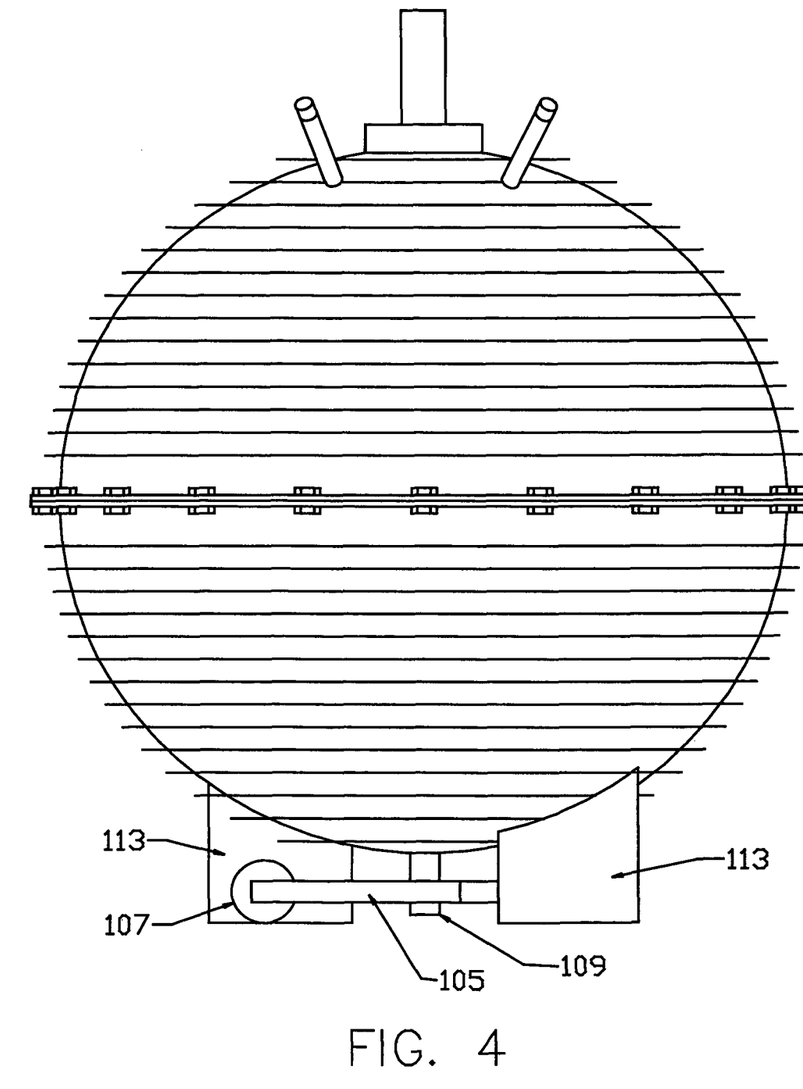
FIG. 4 is an external elevation view of the FIG. 3 apparatus.
Figure 5:
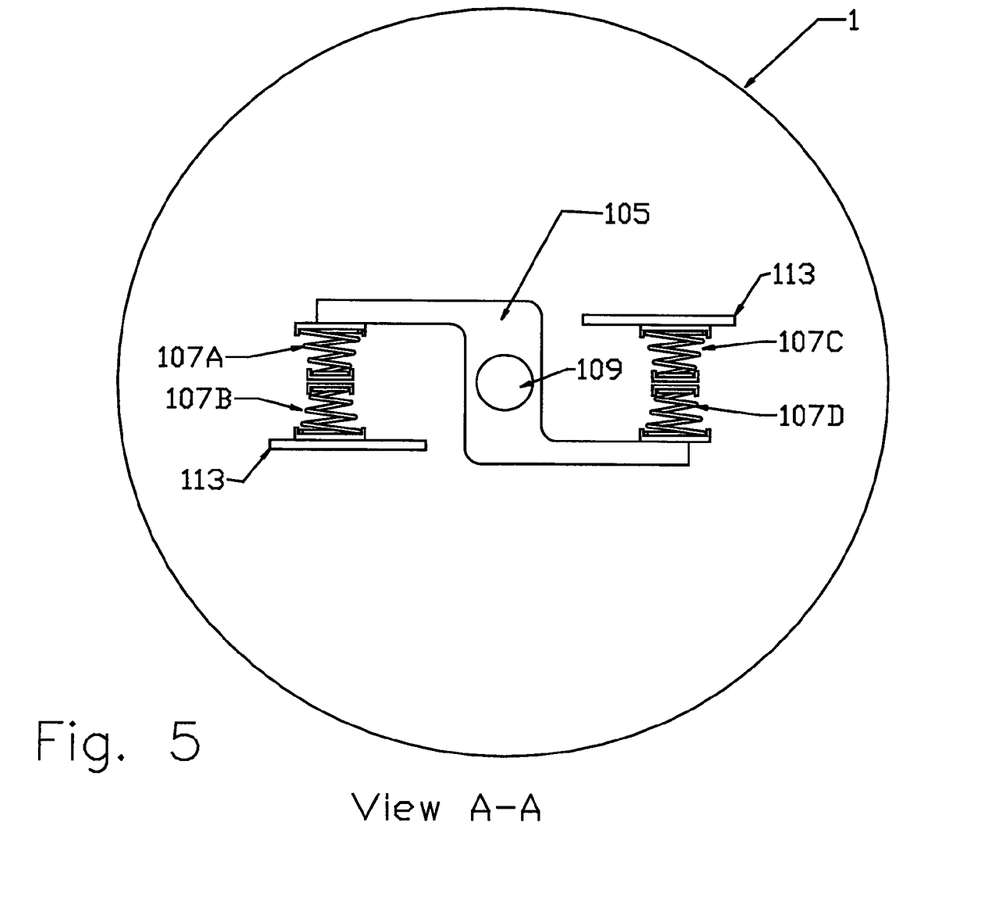
FIG. 5 is a plan view of the spring arrangement of FIGS. 3 and 4.

In the horizontal rotary embodiment, an inner sphere 27 is shown as concentric with an outer sphere 1 and is rotating, since the flange 109a of member 109b (FIG. 3), which is attached to the inner sphere 27 through the member 43 (FIG. 3), rotates on top of thrust bearing 125 (FIG. 3), which in turn rests on member 115 physically attached to sphere 1 by bolts 117 (FIG. 3). The outer sphere 1 is made to rotate in unison with the inner sphere by the external force of the small motor. Furthermore, the outer sphere 1 rotates in unison with the inner sphere 27, since it receives a series of external horizontal impulses by double conic springs, or double Belleville springs (not shown), two of which 107A and 107D (FIG. 5) are endwise physically attached to the shaft 109 (FIG. 3) and (FIG. 4) and the inner sphere through the zig-zag arm 105 (FIG. 5) and the other two 107B and 107C (FIG. 5) are endwise physically attached to the plates 113 (FIG. 5), which are, in turn, attached to the outer sphere 1. The double springs are designed to impart a series of external horizontal forceful impulses to the outer sphere, via the plates 113 (FIG. 5), attached to the outer sphere.

Accordingly, in the horizontal embodiment of the invention, work will be transferred to its surroundings by means of the "rotating shaft" 111 (FIG. 3).

In the vertical embodiment of the invention, work will be transferred to its surrounding by "movement of the boundary", to result in a reduction of weight.

The outer sphere in effect provides a "closed energy system" in relation to its surroundings.

The outer sphere does not share matter with its surroundings, but it is in effect an open momentum system inasmuch as it receives a series of external impulses via the double conic springs 108A and 108B (FIG. 1) not physically bolted to the outer sphere, or the inner sphere, but free to slide up and down the shaft of the inner sphere, which effectively pushes the system lengthwise or upwards, tending to reduce the weight of the system, momentum not being conserved. Also, the outer sphere is an open momentum system because it receives external sources of energy from the motor spinning the whole system, gravitational energy pulling down the working liquid into the bottom of the inner sphere, and electrical energy through the air shaft to heat the compressed air in the northern hemisphere of the inner sphere.

Figures 1, 1A:
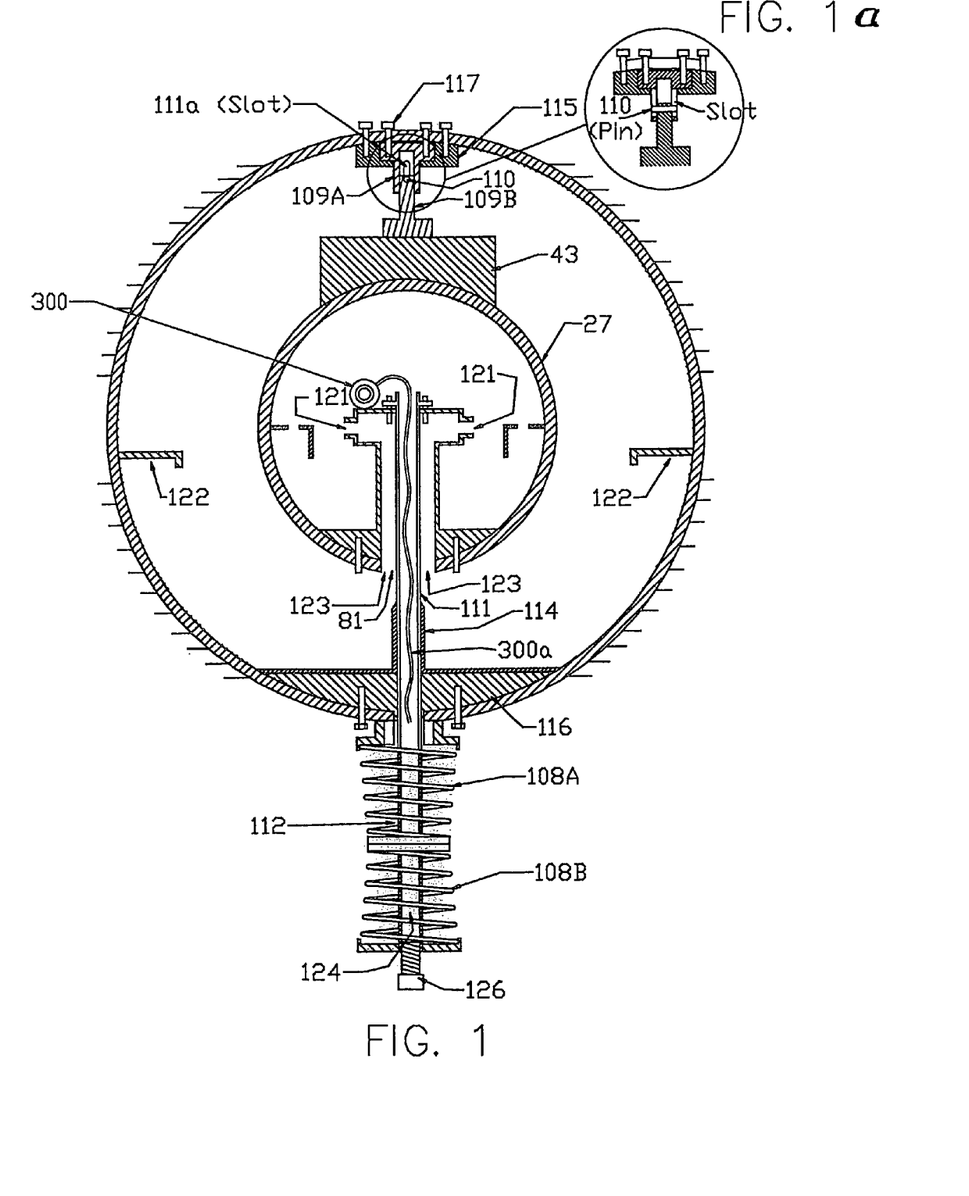
FIG. 1 is a section taken through dual sphere apparatus.
FIG. 1A is an exploded view of a top portion of FIG. 1.

In the vertical embodiment of FIG. 1, the inner sphere and the outer sphere rotate in unison, since they are locked together by a pin 110 that holds together the female member 109A (connected to outer sphere 1) and male member 109B (connected to inner sphere 27), the external force of the small motor attached to the shaft 111 (FIG. 5) imparting rotational force to the system. However, the inner sphere is free to slide up and down within and relative to the outer sphere, since the pin 110 physically attached to the male member 109B can move up and down the slot 111A of female member 109A (FIG. 1). The double conic springs 108A and 108B (FIG. 2), and (FIG. 1) which are free to slide up and down the shaft 111, are attached neither to the shaft nor to the outer sphere, and impart a series of external vertical impulses to the outer sphere. And in this connection, the armature plays an integral role because it combines "rectilinear motion", and "rotational motion" with "circular motion", thus creating a double spiral (the rectilinear and rotational already create a spiral) upward effect on structure in the system, tending to reduce the system weight however small the displacement may be.

On each arm 97 (FIG. 6), there are bolted two jet impulse devices 37 on each end. Arm 97 is bolted at the center (the fulcrum) to the flange 33 of the inner sphere. In operation, the force of each jet impulse device 37 is effectively multiplied by its respective distance to the fulcrum, i.e. the center of the arm 97. In a typical embodiment, at least 16 jet impulse devices may be attached on four arms 97. On each arm 97 there are effectively four associated jet impulse devices. Accordingly, the force provided by each jet impulse device 37 is multiplied by its distance to the fulcrum sixteen (16) times.

Since arm 97 is bolted onto the flange 33 of the inner sphere 27 (see FIG. 2) the total force at the center of each arm 97 is effectively multiplied by the radius of the inner sphere, because the center of the inner sphere is the virtual fulcrum of the two sets of jet impulse devices bolted at the end of each virtual diameter, and applies force to the shaft which is attached to it. By means of the conic springs a series of external impulses is applied to the outer sphere. Therefore, a multiplication of forces is inherent to the design of the system, just as it is inherent to the Kinetic Energy equation: $K=\frac{1}{2} mv^2$ that the energy of the reaction mass ejecting out of the bell-shaped nozzles is quadrupled, each time its velocity is doubled. And, there are a total of eight (8) radii in four (4) diameters, which means that the two combined forces at the fulcrum of each Arm 97 must be multiplied eight (8) times. So, there are sixteen (16) plus eight (8), which makes a total of twenty-four (24) multiplications of force integral to the design and function of the inner sphere.

Figure 2:
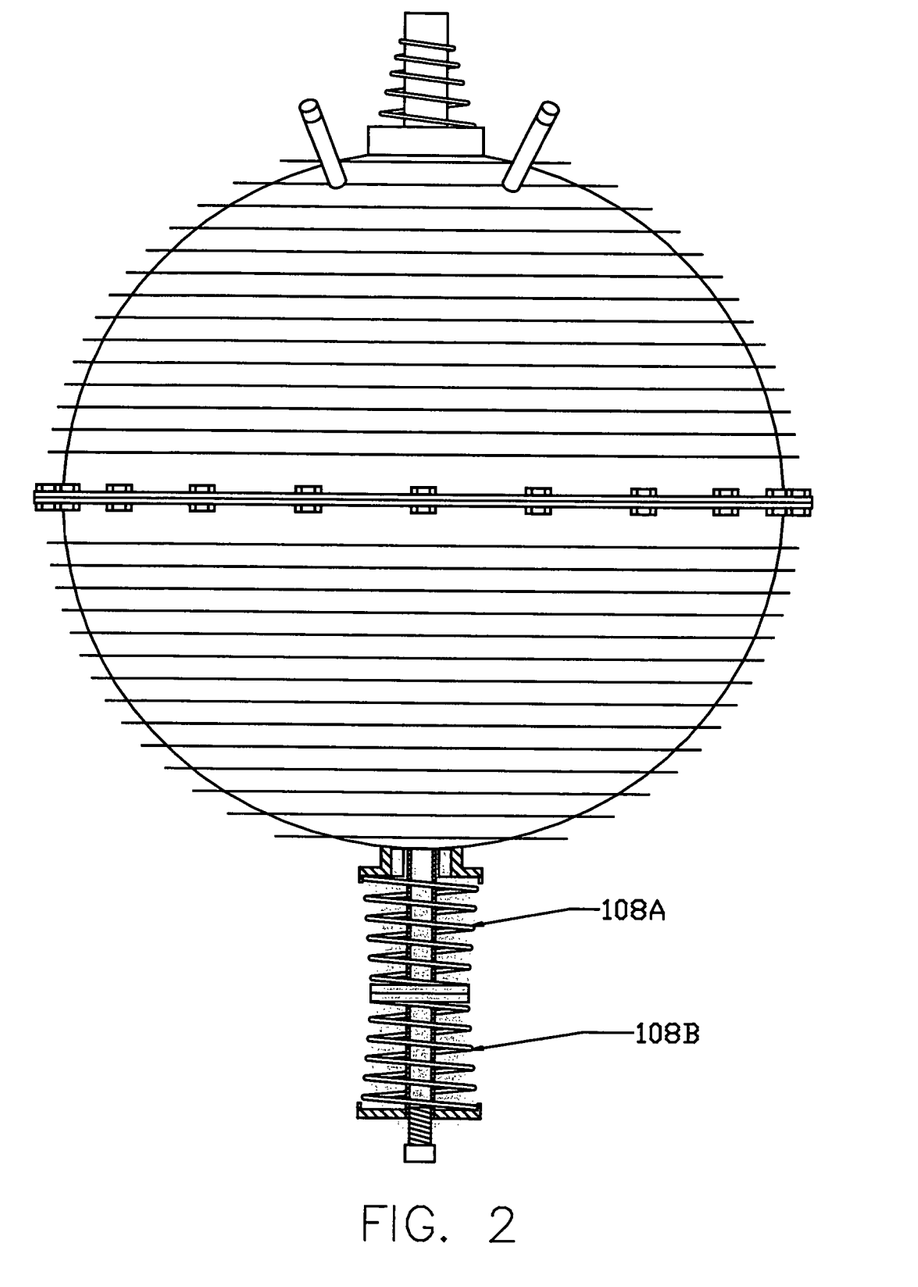
FIG. 2 is an external elevation view of the FIG. 1 apparatus, with springs vertically oriented.

This multiplication of forces imparts a series of upward impulses to the inner sphere, which is transmitted to the outer sphere by means of the conic springs. The use of double conic springs allows the series of impulses to be imparted to the outer sphere with a doubling of action and reaction.

In summary the inner sphere is not physically bolted to the outer sphere, and is therefore free to move. The jet impulse devices impart a series of impulses to the inner sphere either horizontally or vertically, as required. The shaft is physically bolted to the inner sphere, which will have, just like the inner sphere itself, both rotational and translational motion. For the horizontal embodiment the inner sphere will receive a series of impulses by the reaction mass (the liquid) ejecting out of the bell-shaped nozzles of the jet impulse device mounted at 90 degree angles, producing torque. The shaft extends out of the inner sphere. Physically attached to the shaft are the conic springs. On the outer sphere, at the bottom, there are two plates physically attached to the outer sphere. Physically attached to these plates there are two conic springs. The springs attached to the shaft are made to impart a series of impulses to the springs attached to the outer sphere, thus externalizing the inner forces.

Figure 6:
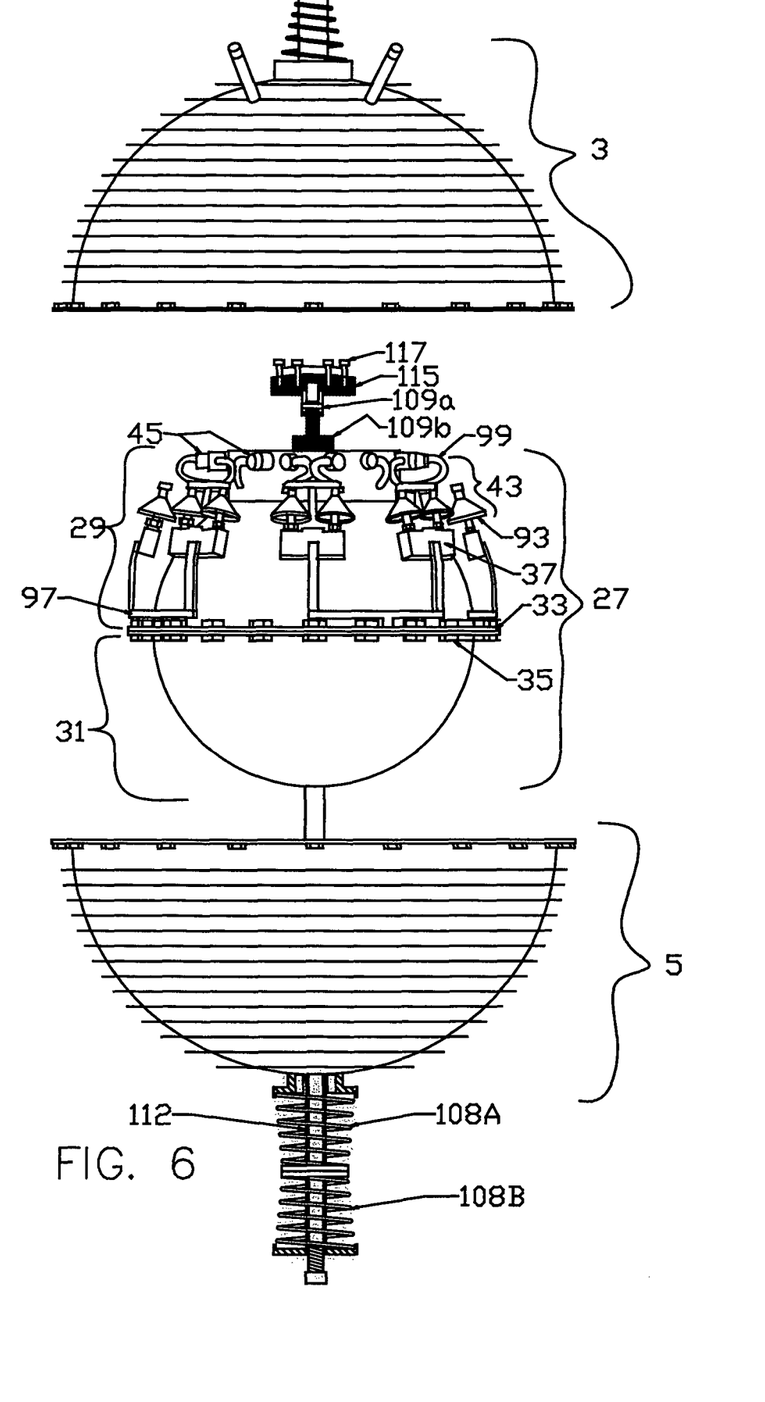
FIGS. 6 and 7 show liquid impulse jets provided for use with the FIG. 1 and FIG. 3 devices.
Figure 7:
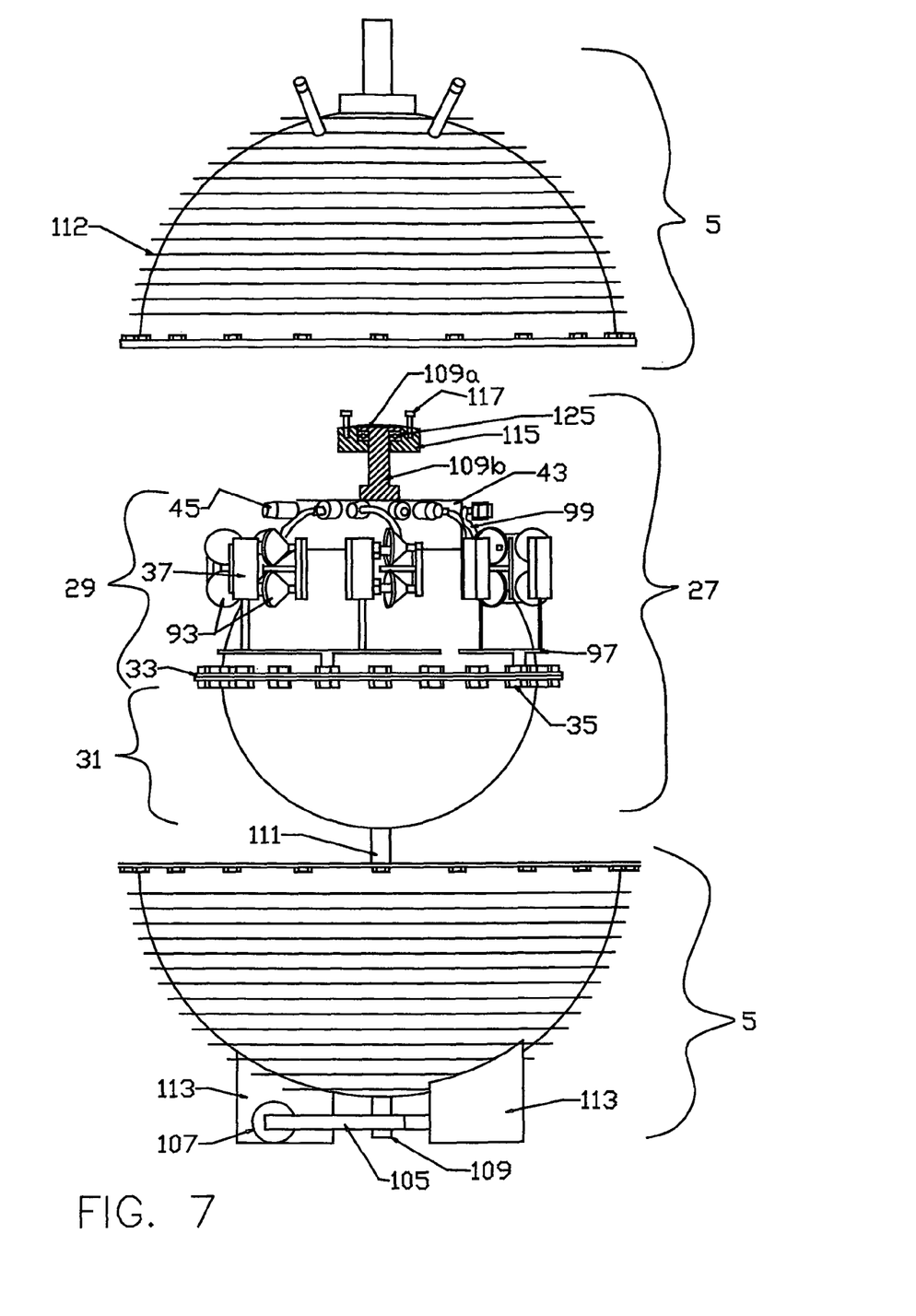

FIGS. 6 and 7 show fluid jet impulse producers attached to the inner spheres seen in FIGS. 1 and 3, respectively, to produce impulses acting vertically and horizontally to displace the spheres.

There are four sources of energy in the system: two internal and two external. The two internal sources of energy are: compressed air (4,000 to 5,000 psi) and Centrifugal Force. The two external sources of energy are: gravitational energy and the output of the small engine attached to the bottom shaft 111 of the inner sphere 27 to rotate the whole system counterclockwise as seen from above. There is an additional external source of energy employed by providing a small electrical heating element 300 into the inner sphere with its electrical cord extending through the shaft 124 (FIG. 1) and by brush contact to a battery (not shown) for the purpose of heating the compressed air in the inner sphere to further increase its pressure in relation to the air pressure in the outer sphere. This extra increase in pressure in the inner sphere as by an external source of energy is preferably monitored, so as not to interfere with the centrifugal force that causes the working liquid to be spilled out of the spiraling hoses 59, which is then pulled down by gravitational force into the southern hemisphere of the inner sphere to complete the cycle. Also, most importantly, the elongated conduits 58 and the inner sphere should be properly insulated (not shown) to make sure that the heat introduced by the electrical element is not transmitted to the outer sphere.

Also shown in FIG. 6 are:
29 northern hemisphere
31 southern hemisphere
33 flange where hemisphere meet
35 bolts connecting the hemisphere
29 north pole of inner sphere 27
108A 108B compression springs
45 couplers
37 jet impulse devices
33 flange
27 inner sphere
99 conduits
93 nozzles ejecting fluid downwardly
97 arm
3-5 hemispheres of outer sphere
Also shown in FIG. 7 are:
37 jet impulse nozzles arranged circularly about axis for rotating inner sphere 27, 29 and 31 about the axis by ejecting liquid generally transversely
45 couplers
99 conduits
105 arm
107 springs operatively connected to arm 105
5 hemisphere of outer sphere.

As disclosed in patent Ser. No. 13/449,697, a plurality of elongated conduits 58 can be coupled at one end to the plurality of upper nozzles 59. Liquid passing through the elongated conduits 58 can pass through the upper nozzles 59, through internal conduits, and into the plurality of liquid couplers 45 arranged on the outer surface of the cylindrical portion 43. By this flow path, liquid can pass from within the inner sphere 27 to the outer sphere.

As described previously, liquid passes through a plurality of upper nozzles 59, through the inner conduits of the cylindrical portion 43, out to the liquid couplers 45, and finally to the jet impulse devices 37 where the liquid is ejected outwards into the space between the inner sphere and outer spheres. This configuration allows the working liquid to be transferred from the lower or southern hemisphere 31, up through the upper or northern hemisphere 29 of the inner sphere 27 to the jet impulse devices 37 and into the space between the inner sphere and outer sphere. The bell-shaped nozzles cause liquid to be reversed, deflected, and dispersed, once emitted out the open bottom sides of the bell-shaped nozzle. Each bell-shaped nozzle has a skirt 95 at the bottom. This skirt ensures the proper function of the nozzle and the jet impulse device itself. The ejected liquid flows in a pulsating manner because each bell-shaped nozzle is coupled with a pulsating valve 70.

I claim:
1. An Energy Transfer and Recycling Open-Closed Hybrid System for transferring potential energy to kinetic energy to do work, and for recycling kinetic energy back to potential energy by a circulation of a pressurized liquid provided in an inner spherical container and an outer spherical container, from an inner container to an outer container, and from the outer container to the inner container, comprising:
   a) an outer sphere,
   b) an inner sphere located within and movable relative to the outer sphere,
   c) said inner sphere comprising:
      an input aperture in a southern pole defined by said inner sphere;
   d) there being a plurality of impulse generators arranged on an outer surface of said inner sphere, and generating impulses;
   e) a liquid flow path arranged to conduct liquid from said input aperture to the impulse generators, and into space formed between said inner sphere and said outer sphere,
   f) said system receiving energy input from exterior of the system, for operational use,
   g) a shaft attached to said inner sphere,
   h) and springs located to transmit said impulses via the shaft to said outer sphere,
   i) wherein the impulse generators are located to transmit said impulses about an axis of the shaft and lengthwise of said axis; the system also including,
   j) the shaft being a hollow shaft coupled to and extending through the input aperture, the shaft in liquid communication with the input aperture;
   k) the system also including a plurality of spiraling liquid-delivery hoses in liquid communication with the input aperture,
   l) an L-shaped lip protruding internally from an inner surface of a southern hemisphere defined by said inner sphere, the L-shaped lip extending around a perimeter of said southern hemisphere, and there being on said lip,
   m) upper surface and lower surface,
   n) a plurality of lower holes between said upper surface and said lower surface,
   o) and a plurality of lower nozzles mounted on said upper surface, each lower nozzle of the plurality of lower nozzles arranged over one of the plurality of lower holes.

2. The system of claim 1 wherein said impulse generators include liquid jet producers, and wherein said upper surface further defines:
   a plurality of upper holes extending between an inner surface of a northern hemisphere of the inner sphere and an outer surface of the northern hemisphere;
   and there being a plurality of upper nozzles mounted onto said upper surface, each upper nozzle of the plurality of upper nozzles arranged to extend over one of said upper holes;
   a plurality of pulsating valves disposed beneath the plurality of lower holes;
   a plurality of elongated conduits, each of the plurality of elongated conduits coupled at one end thereof to one end of the lower nozzle, and at other end thereof to one of the plurality of upper nozzles,
   and wherein the plurality of impulse generators are in liquid communication with the plurality of upper holes.

3. The system of claim 2 wherein the liquid flow path is defined by:
   the liquid passing from within the space between the outer sphere and the inner sphere, through the input aperture, through the spiraling liquid-delivery hoses, into the southern hemisphere of the inner sphere, through the plurality of lower holes, through the plurality of pulsating valves, through the plurality of elongated conduits, through the plurality of upper holes, through a plurality of slimmer elongated conduits, through said plurality of impulse generators and back into space defined between the inner sphere and the outer sphere.

4. The system of claim 2, wherein each of the pulsating valves comprises:
   a shaft mounted underneath one of the plurality of lower holes on the L-shaped lip and oriented radially in relation to the southern hemisphere of the inner sphere, the shaft configured to rotate without being impeded by centrifugal force during rotation of the inner sphere; and
   a plurality of asymmetric veins extending outwardly from the shaft,
   wherein the shaft is configured to rotate as stated to permit the liquid to pass therethrough in intermittent pulses through the lower hole, into one of the lower nozzles, into one of the elongated conduits, and to one of the jet impulse devices.

5. A method for transferring potential energy to kinetic energy by the circulation of the pressurized liquid in the inner sphere and the outer sphere, from the inner sphere to the outer sphere, the method comprising:
   providing the system of claim 2;
   introducing the liquid into the inner sphere up to about % an inch above the L-shaped lip;
   introducing the liquid into the space between the inner sphere and the outer sphere that rises to same level of the liquid in two of the spiraling liquid-delivery hoses in the inner sphere, thus creating a waterfall effect in relation to the liquid at the bottom of the inner sphere;
   introducing compressed air into a northern zone of the outer sphere simultaneously with introducing said compressed air into a northern zone of the inner sphere such that the pressure within the space between the inner sphere and the outer sphere is substantially equal to the pressure within the interior of the inner sphere; and
   rotating the system to cause the liquid in the spiraling liquid-delivery hoses to spill due to centrifugal force, and fall to the bottom of the inner sphere attracted by the force of gravity, thereby increasing the potential energy of the compressed air in the inner sphere, which coupled with centrifugal force pushes the liquid up to the elongated conduits, to bell-shaped nozzles of the jet impulse devices and ejected from them with high velocity becoming kinetic energy.

6. A method for recycling kinetic energy back to potential energy, by a continuous reversal of a pressurized liquid sphere, the method comprising: providing the system of claim 2;
   introducing the liquid into the inner sphere up to an inch above the L-shaped lip;
   introducing the liquid into the space between the inner sphere and the outer sphere that rises to the same level of the liquid in two of the spiraling liquid-delivery hoses in the inner sphere, thus creating a waterfall effect in relation to the liquid at the bottom of the inner sphere;

introducing compressed air into the northern zone of the outer sphere simultaneously with introducing compressed air into the northern zone of the inner sphere such that the pressure within the space between the inner sphere and the outer sphere is substantially equal to the pressure within the interior of the inner sphere; and employing external energy for rotating the system to cause the liquid to be ejected out of bell-shaped nozzles and to return through the input aperture, through the spiraling liquid-delivery hoses, and to spill due to centrifugal force, and fall to the bottom of the inner sphere attracted by the force of gravity, becoming again potential energy of compressed air within the inner sphere.

7. A method for enabling the utilization of the constant supply of gravitational energy of the Earth, by a continuous reversal of a pressurized liquid sphere, the method including:

providing the system of claim 2;
providing said outer sphere partially filled with the liquid and partially filled with compressed air provided from an external source;
providing said inner sphere enclosed within the outer sphere, the inner sphere partially filled with the liquid and partially filled with compressed air;
providing a plurality of jet impulse devices arranged on an outer surface of the inner sphere;
providing the plurality of elongated conduits in liquid communication both with the plurality of jet impulse devices and the liquid within the inner sphere;
providing means for delivering the liquid to the inner sphere;
rotating the spheres, using external energy, thereby causing the liquid from the liquid-delivery means to fall to the bottom of the inner sphere attracted by gravity, creating a waterfall effect in relation to the liquid at the bottom of the inner sphere, thereby increasing the potential energy of the compressed air in the inner sphere, which coupled with centrifugal force pushes the liquid up through the plurality of elongated conduits, and to the plurality of jet impulse devices in liquid communication with the elongated conduits, wherein the liquid is ejected from the jet impulse devices with high velocity becoming kinetic energy, thus making use of the gravitational energy of the Earth; to accomplish the following;
a transfer of potential energy of the compressed air in the inner sphere to kinetic energy of the liquid ejected from said jet impulse devices, and recycling kinetic energy of the ejected liquid, back to potential energy of trapped compressed air in the inner sphere.

8. The method of claim 7, wherein the liquid-delivery means comprises a variable speed water pump configured to cause the liquid to spill and fall attracted by gravity in the inner sphere.

9. The method of claim 7, wherein the liquid-delivery means comprises a spiral configuration of the spiraling liquid-delivery hoses within the inner sphere, the spiraling liquid-delivery hoses filled with the liquid whose level is the same as the level of the liquid in the outer sphere.

10. The system of claim 7, wherein rotating the system comprises applying rotational force with a small motor external to the spheres.

11. The method of claim 10, wherein the small motor applies rotational force to the inner sphere.

12. A jet impulse device for use in reversing, deflecting, and dispersing pressurized liquid, the device comprising:
providing the system of claim 2;
there being an input base having two liquid intakes; two hose barbs extending from the input base, each hose barb of the two hose barbs comprising a mouth at one end;
two inner conduits, each conduit extending between a mouth of each of the hose barb and a liquid intake;
two bell-shaped nozzles, each of the two bell-shaped nozzles arranged over and spaced apart from the mouth of one of the hose barbs, wherein each of the two bell-shaped nozzles comprises a triangular plate mounted on an inner surface, and a skirt extending from a bottom edge of the two bell-shaped nozzles, and
external means for rotating said device using energy-external to said device.

13. The jet impulse device of claim 12, wherein each of the two bell-shaped nozzles is configured such that the liquid is deflected away from the input base by the triangular plate.

14. The jet impulse device of claim 12, wherein the skirt of each of the two bell-shaped nozzles is configured to substantially facilitate the liquid to be ejected in a vertical manner.

15. The system of claim 1, wherein the impulse generators are located between the inner sphere and the outer sphere and bolted to a flange defined by the inner sphere, the system configured such that the liquid flows through the liquid flow path upon rotation and pre-pressurization of the system.

16. The system of claim 15 wherein the impulse generators define liquid jets contained between said spheres, for cycling the liquid from the outer sphere to the inner sphere, there being a plurality of jet impulse devices provided and oriented to direct the liquid into the space between the inner sphere and the outer sphere.

17. The system of claim 16 wherein the liquid jets are oriented vertically.

18. The system of claim 16 wherein the liquid jets are oriented horizontally, and are spaced about an axis of the inner sphere.

19. The system of claim 16 including a shaft extending through a center of the inner sphere, and spaced from said liquid jets to orient said inner sphere.

20. The system of claim 19 wherein the shaft is carried by the inner sphere.

21. The system of claim 1, wherein the space between the outer sphere and the inner sphere is partially filled with the liquid and partially filled with compressed air.

22. The system of claim 21, wherein rotating the system causes an air pressure of the interior of the inner sphere to increase due to addition of more the liquid brought about by gravity through the plurality of the spiraling liquid-delivery hoses in liquid communication with the shaft, and
wherein the total amount of the liquid supplied by the spiraling liquid-delivery hoses is substantially equal to the total amount of the liquid that exits bell-shaped nozzles of all the jet impulse devices combined.

23. The system of claim 1, wherein the inner sphere is partially filled with the liquid and partially filled with compressed air.

24. The system of claim 1 including an external source of energy provided by a small electrical heating element placed in the north pole of the inner sphere with its electrical cord extending through an air shaft for purpose of heating compressed air in the inner sphere to further increase its pressure in relation to an air pressure in the outer sphere.

* * * * *